United States Patent
Meng et al.

(10) Patent No.: US 12,203,011 B2
(45) Date of Patent: Jan. 21, 2025

(54) TWO-COMPONENT ADHESIVE COMPOSITIONS, ARTICLES PREPARED WITH SAME AND PREPARATION METHODS THEREOF

(71) Applicant: Dow Global Technologies LLC, Midland, MI (US)

(72) Inventors: Qingwei Meng, Shanghai (CN); Yu Chen, Shanghai (CN); Shaoguang Feng, Shanghai (CN); Huan Chen, Beijing (CN); Xuemei Zhai, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 349 days.

(21) Appl. No.: 17/598,989

(22) PCT Filed: May 15, 2019

(86) PCT No.: PCT/CN2019/087007
§ 371 (c)(1),
(2) Date: Sep. 28, 2021

(87) PCT Pub. No.: WO2020/227962
PCT Pub. Date: Nov. 19, 2020

(65) Prior Publication Data
US 2022/0213363 A1    Jul. 7, 2022

(51) Int. Cl.
| | | |
|---|---|---|
| C09J 175/04 | (2006.01) |
| C08G 18/12 | (2006.01) |
| C08G 18/28 | (2006.01) |
| C08G 18/42 | (2006.01) |
| C08G 18/50 | (2006.01) |
| C08G 18/76 | (2006.01) |
| C08G 18/77 | (2006.01) |

(52) U.S. Cl.
CPC ............ C09J 175/04 (2013.01); C08G 18/12 (2013.01); C08G 18/289 (2013.01); C08G 18/42 (2013.01); C08G 18/5021 (2013.01); C08G 18/7664 (2013.01); C08G 18/771 (2013.01); C08G 2170/00 (2013.01); C09J 2301/30 (2020.08)

(58) Field of Classification Search
CPC ......... C09J 175/02–08; C08G 18/5096; C08G 18/6469; C08G 73/0206–022; C08G 2650/06; C08L 75/02–08
See application file for complete search history.

(56) References Cited

U.S. PATENT DOCUMENTS

| | | |
|---|---|---|
| 4,507,443 A | 3/1985 | Barron et al. |
| 4,535,121 A | 8/1985 | Oezelli et al. |
| 4,791,214 A | 12/1988 | Mori et al. |
| 8,282,959 B2 | 10/2012 | Arthur et al. |
| 8,901,186 B2 | 12/2014 | Eling et al. |
| 9,212,251 B2 | 12/2015 | Frick et al. |
| 9,340,682 B2 | 5/2016 | Burckhardt et al. |
| 9,856,374 B2 | 1/2018 | Kelch et al. |
| 10,155,890 B2 | 12/2018 | Vietti et al. |
| 2011/0143064 A1 | 6/2011 | Da Silva et al. |
| 2012/0157620 A1* | 6/2012 | Nagy .................. C09D 175/04 564/457 |

FOREIGN PATENT DOCUMENTS

| | | |
|---|---|---|
| CA | 2494997 C | 11/2012 |
| WO | 2011024014 A1 | 3/2011 |
| WO | 2015/168670 A1 | 11/2015 |
| WO | 2018146670 A1 | 8/2018 |
| WO | WO-2018140116 A1 * | 8/2018 ............. C08G 18/10 |

OTHER PUBLICATIONS

Office Action from corresponding Chinese Patent Application: 201980095730.5 with a mailing date of Oct. 9, 2023.
PCT/CN2019/087007, International Search Report and Written Opinion with a mailing date of Feb. 26, 2020.
PCT/CN2019/087007, International Preliminary Report on Patentability with a mailing date of Nov. 16, 2021.

* cited by examiner

*Primary Examiner* — Stephen E Rieth

(57) ABSTRACT

A two-component adhesive composition is provided. The two-component adhesive composition comprises an isocyanate component, an isocyanate-reactive component and an polyether amine-epoxy silane adduct, and can achieve superior adhesion strength between the adhesive and a substrate like metal alloy substrate. A laminated article prepared with said composition, a method for preparing the article and the use of the polyether amine-epoxy silane adduct as adhesion promoter in a two-component polyurethane adhesive composition are also provided.

6 Claims, 1 Drawing Sheet

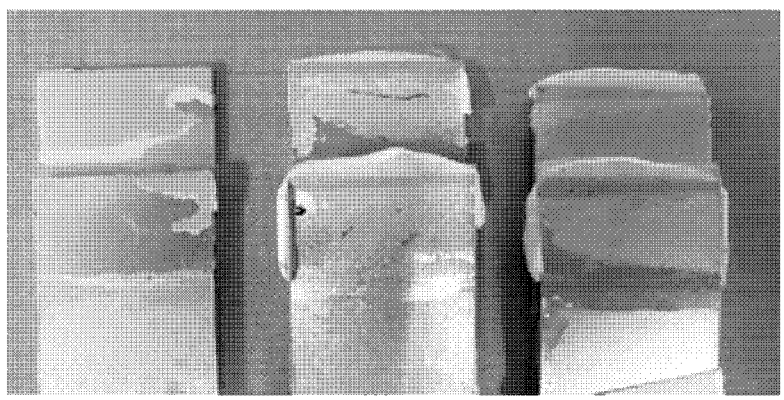
Comparative Example 5     Inventive Example 1     Inventive Example 2

TWO-COMPONENT ADHESIVE COMPOSITIONS, ARTICLES PREPARED WITH SAME AND PREPARATION METHODS THEREOF

FIELD OF THE INVENTION

The present disclosure relates to a two-component adhesive composition, a laminate article prepared with the two-component adhesive composition, a method for preparing the article and the use of a polyether amine-epoxy silane adduct as an adhesion promoter in a two-component polyurethane adhesive composition. The two-component adhesive composition produces an adhesive layer with excellent adhesion strength to various metal or metal alloy substrates.

BACKGROUND TECHNOLOGY

Adhesive compositions are useful for a wide variety of purposes. The use of adhesives in different end-use applications is generally known. For example, adhesives can be used in the manufacture of film/film and film/foil laminates used in the packaging industry. Solventless laminating adhesives can be free of any organic solvent or aqueous carrier and may comprise up to one hundred percent solids. Due to the absence of organic solvent or water which has to be removed from the adhesive upon application, the solventless adhesives can be applied at a rather high line speed and are preferable in applications requiring quick adhesive application. Meanwhile, the disadvantages concerning environmental protection, health, and process safety can also be avoided.

Various kinds of solventless laminating adhesives have been reported, and a lot of researches have been made on the two-component polyurethane-based laminating adhesives. Typically, a two-component polyurethane-based laminating adhesive includes a first component comprising an isocyanate-containing prepolymer and a second component comprising one or more polyols. The first component can be obtained by the reaction of an isocyanate monomer with an isocyanate-reactive compound such as a polyether polyol and/or a polyester polyol. The second component is an isocyanate-reactive compound such as a polyether polyol and/or a polyester polyol. Each component can optionally include one or more additional additives. The two components are combined in a predetermined ratio and applied on a film/foil substrate, which is then laminated to another film/foil substrate.

Nevertheless, the traditional two-component solventless polyurethane-based laminating adhesives exhibit several disadvantages when compared to traditional solvent-borne adhesives, such as high initial viscosity, weak initial bonds and slow bond development before the laminate can be processed. In addition, these adhesives tend to exhibit relatively poor chemical resistance, especially in acidic conditions. Furthermore, the existing solventless adhesives exhibit poor adhesion strength to substrate made of metal or metal alloys, such as aluminum alloys. It has been reported that additives or modifiers can be incorporated to improve one or more of the above stated performance properties, but none of them successfully achieve satisfactory properties, especially adhesion strength to metal or metal alloy substrate. It has also been reported that the adhesion promoters have additional shortcomings such as weak resistance to acid, alkali, moisture, heat, irradiation, etc.

For the above reasons, two-component solventless polyurethane-based laminating adhesive compositions with enhanced adhesion strength and improvement in other performance properties as stated above are desirable.

After persistent exploration, we have surprisingly developed a solventless polyurethane-based adhesive composition which can achieve one or more of the above targets.

SUMMARY OF THE INVENTION

The present disclosure provides a unique solventless polyurethane adhesive composition comprising a polyether amine-epoxy silane adduct, a laminate article prepared by using the composition, a method for preparing the laminate article, and the use of the polyether amine-epoxy silane adduct as adhesion promoter in the polyurethane adhesive composition.

In a first aspect of the present disclosure, the present disclosure provides a two-component adhesive composition, comprising
  (A) an isocyanate component comprising one or more compounds having at least two isocyanate groups; and
  (B) an isocyanate-reactive component comprising one or more compounds having at least two isocyanate-reactive groups, and
  the two-component adhesive composition further comprises a polyether amine-epoxy silane adduct derived from the reaction between: (i) at least one linear or branched, aliphatic, cycloaliphatic, or aromatic polyether amine; and (ii) at least one epoxy-silane compound having one, two, three or four epoxide groups per molecule.

In a second aspect of the present disclosure, the present disclosure provides a laminate article comprising a first substrate, a second substrate and an adhesive layer therebetween, wherein the adhesive layer is prepared with the above indicated two-component adhesive composition by reacting the isocyanate component (A) with the isocyanate-reactive component (B) and the polyether amine-epoxy silane adduct, and the adhesive layer comprises a polyurethane main chain to which residual moiety of the polyether amine-epoxy silane adduct is covalently attached.

In a third aspect of the present disclosure, the present disclosure provides a method for preparing the laminate article, comprising the steps of providing the first substrate and the second substrate; combining the isocyanate component (A) with the isocyanate-reactive component (B) and the polyether amine-epoxy silane adduct to form an adhesive precursor; adhering the first substrate and the second substrate together with the adhesive precursor; and optionally, curing the adhesive precursor or allowing the adhesive precursor to cure.

In a fourth aspect of the present disclosure, the present disclosure provides a use of the polyether amine-epoxy silane adduct as adhesion promoter in a two-component polyurethane adhesive composition, wherein
  the polyether amine-epoxy silane adduct is derived from the reaction between: (i) at least one linear or branched, aliphatic, cycloaliphatic, or aromatic polyether amine; and (ii) at least one epoxy-silane compound having one, two, three or four epoxide groups per molecule; and
  the two-component polyurethane adhesive composition comprises (A) an isocyanate component comprising one or more compounds having at least two isocyanate groups; and (B) an isocyanate-reactive component comprising one or more compounds having at least two isocyanate-reactive groups;

wherein the reaction of (A) isocyanate component with (B) isocyanate-reactive component and the polyether amine-epoxy silane adduct produces a polyurethane main chain to which residual moiety of the polyether amine-epoxy silane adduct is covalently attached.

It is to be understood that both the foregoing general description and the following detailed description are exemplary and explanatory only and are not restrictive of the invention, as claimed.

BRIEF DESCRIPTION OF THE DRAWINGS

FIG. 1 is a photograph of the laminate articles prepared according to some embodiments described herein.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, the term "composition", "formulation" or "mixture" refers to a physical blend of different components, which is obtained by mixing simply different components by a physical means.

As disclosed herein, "and/or" means "and, or as an alternative". All ranges include endpoints unless otherwise indicated.

According to an embodiment of the present disclosure, the solventless adhesive composition is a "two-component", "two-part" or "two-package" composition comprising an isocyanate component (A) and an isocyanate-reactive component (B). The isocyanate component (A) and the isocyanate-reactive component (B) are transported and stored separately, combined shortly or immediately before being applied during the manufacture of the laminate article. Once combined, the isocyanate groups in component (A) reacts with the isocyanate-reactive groups in component (B) in the presence of the polyether amine-epoxy silane adduct to form polyurethane. The polyether amine-epoxy silane adduct also comprises isocyanate-reactive groups like hydroxyl and amine groups, hence a residual moiety of the polyether amine-epoxy silane adduct is also covalently attached to the main chain of the polyurethane.

The Isocyanate Component (A)

In various embodiments, the isocyanate component (A) has an average functionality of at least about 2.0, preferably from about 2 to 10, more preferably from about 2 to about 8, and most preferably from about 2 to about 6. In some embodiments, the isocyanate component includes one or more polyisocyanate compound comprising at least two isocyanate groups. Suitable polyisocyanate compounds include aromatic, aliphatic, cycloaliphatic and araliphatic polyisocyanates having two or more isocyanate groups. In a preferable embodiment, the polyisocyanate component comprises polyisocyanate compounds selected from the group consisting of $C_4$-$C_{12}$ aliphatic polyisocyanates comprising at least two isocyanate groups, $C_6$-$C_{15}$ cycloaliphatic or aromatic polyisocyanates comprising at least two isocyanate groups, $C_7$-$C_{15}$ araliphatic polyisocyanates comprising at least two isocyanate groups, and combinations thereof. In another preferable embodiment, suitable polyisocyanate compounds include m-phenylene diisocyanate, 2,4-toluene diisocyanate and/or 2,6-toluene diisocyanate (TDI), the various isomers of diphenylmethanediisocyanate (MDI), carbodiimide modified MDI products, hexamethylene-1,6-diisocyanate, tetramethylene-1,4-diisocyanate, cyclohexane-1,4-diisocyanate, hexahydrotoluene diisocyanate, hydrogenated MDI, naphthylene-1,5-diisocyanate, isophorone diisocyanate (IPDI), or mixtures thereof.

Alternatively or additionally, the polyisocyanate component may also comprise a isocyanate prepolymer having an isocyanate functionality in the range of 2 to 10, preferably from 2 to 8, more preferably from 2 to 6. The isocyanate prepolymer can be obtained by reacting the above stated monomeric isocyanate components with one or more isocyanate-reactive compounds selected from the group consisting of ethylene glycol, 1,2-propanediol, 1,3-propanediol, 1,3-butanediol, 1,4-butenediol, 1,4-butynediol, 1,5-pentanediol, neopentyl-glycol, bis(hydroxy-methyl) cyclohexanes such as 1,4-bis(hydroxymethyl)cyclohexane, 2-methylpropane-1,3-diol, methylpentanediols, diethylene glycol, triethylene glycol, tetraethylene glycol, polyethylene glycol, dipropylene glycol, polypropylene glycol, dibutylene glycol and polybutylene glycols. Suitable prepolymers for use as the polyisocyanate component are prepolymers having NCO group contents of from 2 to 40 weight percent, more preferably from 4 to 30 weight percent. These prepolymers are preferably prepared by reaction of the di- and/or poly-isocyanates with materials including lower molecular weight diols and triols. Individual examples are aromatic polyisocyanates containing urethane groups, preferably having NCO contents of from 5 to 40 weight percent, more preferably 20 to 35 weight percent, obtained by reaction of diisocyanates and/or polyisocyanates with, for example, lower molecular weight diols, triols, oxyalkylene glycols, dioxyalkylene glycols, or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, ethylene glycols, propylene glycols, butylene glycols, polyoxypropylene glycols and polyoxypropylene-polyoxyethylene glycols can be used. Polyester polyols can also be used, as well as alkane diols such as butane diol. Other diols also useful include bishydroxyethyl- or bishydroxypropyl-bisphenol A, cyclohexane dimethanol, and bishydroxyethyl hydroquinone.

Also advantageously used for the isocyanate component are the so-called modified multifunctional isocyanates, that is, products which are obtained through chemical reactions of the above isocyanates compounds. Exemplary compounds are polyisocyanates containing esters, ureas, biurets, allophanates and preferably carbodiimides and/or uretoneimines. Liquid polyisocyanates containing carbodiimide groups, uretoneimines groups and/or isocyanurate rings, having isocyanate groups (NCO) contents of from 12 to 40 weight percent, more preferably from 20 to 35 weight percent, can also be used. These include, for example, polyisocyanates based on 4,4'-2,4'- and/or 2,2'-diphenylmethane diisocyanate and the corresponding isomeric mixtures, 2,4- and/or 2,6-toluenediisocyanate and the corresponding isomeric mixtures; mixtures of diphenylmethane diisocyanates and PMDI; and mixtures of toluene diisocyanates and PMDI and/or diphenylmethane diisocyanates.

Generally, the amount of the isocyanate component may vary based on the actual requirement of the adhesive layer and the laminate article. For example, as one illustrative embodiment, the content of the isocyanate component can be from 15 wt % to 60 wt %, or from 20 wt % to 50 wt %, or from 23 wt % to 40 wt %, or from 25 wt % to 35 wt %, based on the total weight of the adhesive composition or the adhesive layer. According to a preferable embodiment of the present disclosure, the molar amount of isocyanate component (A) is properly selected so that the isocyanate group is present at a stoichiometric molar amount relative to the total molar amount of the isocyanate-reactive groups included in the component (B), the adhesion promoter, and any additional additives or modifiers.

The Isocyanate-Reactive Component (B)

In various embodiments of the present disclosure, the isocyanate-reactive component comprises one or more polyols selected from the group consisting of aliphatic polyhydric alcohols comprising at least two hydroxy groups, cycloaliphatic or aromatic polyhydric alcohols comprising at least two hydroxy groups, araliphatic polyhydric alcohols comprising at least two hydroxy groups, polyether polyol, polyester polyol, vegetable oil having at least two hydroxy groups and mixture thereof. Preferably, the polyol is selected from the group consisting of $C_2$-$C_{16}$ aliphatic polyhydric alcohols comprising at least two hydroxy groups, $C_6$-$C_{15}$ cycloaliphatic or aromatic polyhydric alcohols comprising at least two hydroxy groups, $C_7$-$C_{15}$ araliphatic polyhydric alcohols comprising at least two hydroxy groups, polyester polyols having a molecular weight from 100 to 5,000, polyether polyols having a molecular weight from 1,500 to 12,000, and combinations thereof. According to a preferable embodiment, the polyol comprises a polyester polyol, a polyether polyol, a vegetable oil having at least two hydroxy groups, or a combination thereof.

In a preferable embodiment, the isocyanate-reactive component comprises a mixture of two or more different polyols, such as a mixture of two or more polyether polyols, a mixture of two or more polyester polyols, a mixture of at least one polyether polyol with at least one polyester polyol, or a mixture of a polyester polyol and a monomeric polyol.

In a preferable embodiment, the isocyanate-reactive component is a polyester polyol having a molecular weight from 500 to 5,000, preferably from 1000 to 3,000 g/mol so as to achieve good film formability, flexibility and elasticity. The polyester polyol is typically obtained by reacting polyfunctional alcohols having from 2 to 12 carbon atoms, preferably from 2 to 6 carbon atoms, with polyfunctional carboxylic acids having from 2 to 12 carbon atoms, preferably 2 to 6 carbon atoms, or anhydrides/esters thereof. Typical polyfunctional alcohols for preparing the polyester polyol are preferably diols or triols and include ethylene glycol, propylene glycol, butylene glycol, pentylene glycol or hexylene glycol. Typical polyfunctional carboxylic acids can be aliphatic, cycloaliphatic, araliphatic, aromatic or heterocyclic and may be substituted, for example with halogen atoms, and/or may be saturated or unsaturated. Preferably, the polyfunctional carboxylic acids are selected from the group consisting of suberic acid, azelaic acid, phthalic acid, isophthalic acid, phthalic anhydride, tetrahydrophthalic anhydride, hexahydrophthalic anhydride, tetrachlorophthalic anhydride, endomethylene-tetrahydro-phthalic anhydride, glutaric anhydride, alkenylsuccinic acid, maleic acid, maleic anhydride, fumaric acid, dimeric fatty acids. Preference is given to dicarboxylic acids represented the general formula HOOC—$(CH_2)_y$—COOH, where y is an integer from 1 to 20, preferably an even number from 2 to 20. The polyester polyol is preferably terminated with at least two hydroxyl groups. In a preferable embodiment, the polyester polyol has a hydroxyl functionality of 2 to 10, preferably from 2 to 6. In another embodiment, the polyester polyol has an OH number of 80 to 2,000 mg KOH/g, preferably from 150 to 1,000 mg KOH/g, and more preferably from 200 to 500 mg KOH/g. Various molecular weights are contemplated for the polyester polyol. For example, the polyester polyol may have a number average molecular weight of from about 500 g/mol to about 5,000 g/mol, preferably from about 600 g/mol to about 4,000 g/mol, preferably from about 500 g/mol to about 3,000 g/mol, preferably from about 1000 g/mol to about 2,500 g/mol, preferably from about 1200 g/mol to about 2,000 g/mol, and more preferably from about 1,500 g/mol to about 1,800 g/mol.

Alternatively, the polyester polyol includes lactone-based polyesterdiols, which are homopolymers or copolymers of lactones, preferably terminal hydroxyl-functional addition products of lactones with suitable difunctional initiator molecules. Preferred lactones are derived from compounds represented by the general formula HO—$(CH_2)_z$—COOH, where z is an integer from 1 to 20 and one hydrogen atom of a methylene unit may also be replaced by a $C_1$ to $C_4$ alkyl radical. Exemplary lactone-based polyesterdiols include ε-caprolactone, β-propiolactone, γ-butyrolactone, methyl-ε-caprolactone or mixtures thereof.

In another preferable embodiment, the isocyanate-reactive component is a polyether polyol having a functionality (average number of isocyanate-reactive groups, particularly, hydroxyl group, in a polyol molecule) of 1.0 to 3.0 and a weight average molecular weight (Mw) of 1,500 to 12,000 g/mol, preferably from 2,000 to 8,000 g/mol, more preferably from 2,000 to 6,000 g/mol. The polyether polyols is generally prepared by polymerization of one or more alkylene oxides selected from propylene oxide (PO), ethylene oxide (EO), butylene oxide, tetrahydrofuran and mixtures thereof, with proper starter molecules in the presence of a catalyst. Typical starter molecules include compounds having at least 2, preferably from 4 to 8 hydroxyl groups or having two or more primary amine groups in the molecule. Suitable starter molecules are for example selected from the group comprising aniline, EDA, TDA, MDA and PMDA, more preferably from the group comprising TDA and PMDA, an most preferably TDA. When TDA is used, all isomers can be used alone or in any desired mixtures. For example, 2,4-TDA, 2,6-TDA, mixtures of 2,4-TDA and 2,6-TDA, 2,3-TDA, 3,4-TDA, mixtures of 3,4-TDA and 2,3-TDA, and also mixtures of all the above isomers can be used. By way of starter molecules having at least 2 and preferably from 2 to 8 hydroxyl groups in the molecule it is preferable to use trimethylolpropane, glycerol, pentaerythritol, castor oil, sugar compounds such as, for example, glucose, sorbitol, mannitol and sucrose, polyhydric phenols, resols, such as oligomeric condensation products of phenol and formaldehyde and Mannich condensates of phenols, formaldehyde and dialkanolamines, and also melamine. Catalyst for the preparation of polyether polyols may include alkaline catalysts, such as potassium hydroxide, for anionic polymerization or Lewis acid catalysts, such as boron trifluoride, for cationic polymerization. Suitable polymerization catalysts may include potassium hydroxide, cesium hydroxide, boron trifluoride, or a double cyanide complex (DMC) catalyst such as zinc hexacyanocobaltate or quaternary phosphazenium compound. In a preferable embodiment of the present disclosure, the polyether polyol includes (methoxy)polyethylene glycol (MPEG), polyethylene glycol (PEG), poly(propylene glycol) or copolymer of ethylene epoxide and propylene epoxide with primary hydroxyl ended group and secondary hydroxyl ended group.

In another preferable embodiment, the vegetable oil having at least two hydroxyl groups can be a natural vegetable oil (e.g. castor oil) or a modified vegetable oil prepared by catalytic modification (e.g. oxidation, functionalization, etc.) of a natural vegetable oil selected from the group consisting of soybean oil, rapeseed oil, palm oil, safflower oil, sunflower oil, corn oil, linseed oil, tall oil, canola oil, cottonseed oil, castor oil and any combinations thereof.

In general, the content of the isocyanate-reactive component used herein may range from about 50 mol % to about 98 mol %, preferably from about 60 mol % to about 97 mol %, more preferably from about 70 mol % to about 96 mol %, more preferably from about 80 mol % to about 96 mol %, more preferably from about 85 mol % to about 95 mol %, based on the total molar content of the isocyanate component (A).

In the context of the present disclosure, the other compounds comprising functional groups which can react with the isocyanate group, such as the polyether amine-epoxy silane adduct and the phosphate ester polyol, are not within the definition of the so-called "isocyanate-reactive component". The polyether amine-epoxy silane adduct and the phosphate ester polyol can be clearly distinguished from the isocyanate-reactive component by the molecular structure or the functions thereof.

Adhesion Promoters

In various embodiments of the present disclosure, the adhesive composition comprises one or more adhesion promoters selected from the group consisting of polyether amine-epoxy silane adduct, phosphate ester polyol, epoxy-aromatic polyisocyanate adduct, and any combinations thereof. According to another preferable embodiment of the present disclosure, the adhesive composition comprises the polyether amine-epoxy silane adduct and phosphate ester polyol as adhesion promoter. According to another preferable embodiment of the present disclosure, the adhesive composition comprises the polyether amine-epoxy silane adduct and epoxy-aromatic polyisocyanate adduct as adhesion promoter. According to another preferable embodiment of the present disclosure, the adhesive composition comprises the polyether amine-epoxy silane adduct, the phosphate ester polyol and the epoxy-aromatic polyisocyanate adduct as adhesion promoter. In various embodiments of the present disclosure, the polyether amine-epoxy silane adduct and the phosphate ester polyol are supplied, transmitted and stored separately or as an ingredient in the isocyanate-reactive component (B); and the epoxy-aromatic polyisocyanate adduct is supplied, transmitted and stored separately or as an ingredient in the isocyanate component (A).

1. Polyether Amine-Epoxy Silane Adduct

According to an embodiment, the polyether amine-epoxy silane adduct is prepared by the addition reaction between a polyether amine and an epoxy silane compound schematically represented by the following reaction scheme:

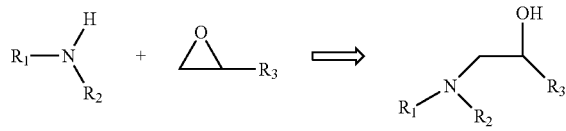

wherein at least one of $R_1$ and $R_2$ is a poly(alkylene oxide) group comprising from 2 to 2,000 carbon atoms, such as a poly(alkylene oxide) group comprising from 4 to 1,000 carbon atoms, or from 6 to 500 carbon atoms, or from 8 to 200 carbon atoms, or from 10 to 100 carbon atoms, or from 12 to 50 carbon atoms, or from 14 to 20 carbon atoms, the poly(alkylene oxide) group may be optionally terminated with an amino group, a hydrogen atom or a $C_1$-$C_6$ alkyl group; meanwhile, one of $R_1$ and $R_2$ can also be selected from the group consisting of hydrogen, $C_2$-$C_{12}$ alkyl group, amino-$C_2$-$C_{12}$ alkyl group, $C_6$-$C_{16}$ cycloalkyl group, amino substituted $C_6$-$C_{16}$ cycloalkyl group, $C_7$-$C_{16}$ aralkyl group, amino substituted $C_7$-$C_{16}$ aralkyl group, $C_6$-$C_{16}$ aryl group and amino substituted $C_6$-$C_{16}$ aryl group; and $R_3$ is the remaining moiety of the epoxy-silane compound, and is preferably a silane group optionally having additional epoxy terminal groups. Nevertheless, it shall be noted that the above stated reaction scheme is merely schematic, and the glycidyl shown above can also be replaced with an epoxidized $C_1$-$C_6$ cycloalkyl group.

According to a preferable embodiment of the present application, $R_1$ is a poly(alkylene oxide) group as stated above, while $R_1$ is a poly(alkylene oxide) group or the other substituting groups as stated above. When both $R_1$ and $R_2$ are poly(alkylene oxide) groups, they can be either identical or different.

The polyether amine may be any linear or branched, aliphatic, cycloaliphatic or aromatic polyether amine. In a preferable embodiment, the poly(alkylene oxide) group is a polypropylene oxide group or a polyethylene oxide group. In another preferable embodiment, the polyether amine comprises one, two or more primary amine moieties.

According to one embodiment of the present disclosure, the epoxy-silane compound suitable for preparing the adduct comprises an average of one, two, three or four epoxide groups per molecule. According to an embodiment of the present disclosure, the epoxy-silane compound has a formula of

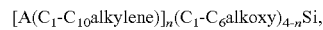

wherein A is selected from the group consisting of glycidyl, glycidyloxy and epoxidized $C_4$-$C_6$ cycloalkyl, wherein n is an integer of 1, 2, 3 or 4.

Preferred epoxy-silane compound is [glycidyl($C_2$-$C_6$ alkylene)]($C_1$-$C_4$ alkoxy)$_3$Si or (epoxidized $C_4$-$C_6$ cycloalkyl)($C_1$-$C_4$ alkoxy)$_3$Si. According to a preferable embodiment of the present disclosure, the epoxy-silane compound is (glycidylpropylene)(methoxy)$_3$Si or 2-(3,4-epoxycyclohexyl)ethyltriethoxysilane.

Without being limited to theory, the above stated addition reaction will produce a hydroxyl group, and the adduct may also comprise a hydrogen atom directly attached to a nitrogen atom (i.e. N—H). These active groups in the adduct may further react with the isocyanate group in the isocyanate component (A), thus covalently attaching the residual moiety of the adduct to the main chain of the polyurethane in the adhesive layer and achieving the function of adhesion promotion.

According to one embodiment of the present disclosure, the molar ratio between the amine and the epoxy compound in the adduct is from 1:3 to 10:1, or from 1:2 to 8:1, or from 1:1 to 6:1, or from 1:1 to 5:1, or from 1:1 to 4:1, or from 1:1 to 3:1, or from 1:1 to 2:1.

The adduct may be prepared in the presence of an optional crosslinking agent such as a polyether described above. In another embodiment, the addition reaction may occur under elevated temperature (e.g. under reflux) or decreased pressure.

In general, the content of the content of the amine-epoxy adduct is from 1 wt % to 40 wt %, or from 5 wt % to 35 wt %, or from 10 wt % to 30 wt %, or from 12 wt % to 25 wt %, or from 15 wt % to 20 wt %, based on the weight of the isocyanate-reactive component (B).

2. Epoxy-Aromatic Diisocyanate Adduct

According to an embodiment, the epoxy-aromatic diisocyanate adduct is prepared by the addition reaction between an epoxy compound and an aromatic diisocyanate compound represented by the following reaction scheme:

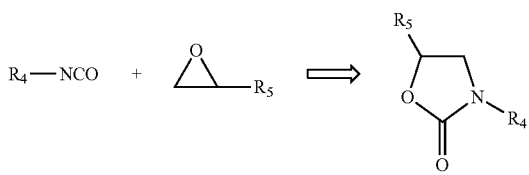

wherein $R_4$ is a linear or branched $C_6$-$C_{15}$ arylene terminated with another isocyanate group, and $R_5$ is the remaining moiety of the epoxy compound.

Without being limited to theory, the above stated addition reaction will produce a five-member oxazolidinone ring and the adduct is terminated with free isocyanate groups. During the reaction between the isocyanate component (A) and the isocyanate-reactive component (B), the free isocyanate group in the adduct may react with the isocyanate-reactive group in component (B), thus covalently attaching the residual moiety of the adduct (especially the oxazolidinone ring) to the main chain of the polyurethane in the adhesive layer and achieving the function of adhesion promotion.

According to one embodiment of the present disclosure, the molar ratio between the aromatic diisocyanate compound and the epoxy compound in the adduct is from 1:3 to 10:1, or from 1:2 to 8:1, or from 1:1 to 6:1, or from 1:1 to 5:1, or from 1:1 to 4:1, or from 1:1 to 3:1, or from 1:1 to 2:1.

According to one embodiment of the present disclosure, the aromatic diisocyanate compound is selected from the group consisting of m-phenylene diisocyanate, 2,4-toluene diisocyanate and/or 2,6-toluene diisocyanate (TDI), the various isomers of diphenylmethanediisocyanate (MDI), carbodiimide modified MDI products, naphthylene-1,5-diisocyanate, isophorone diisocyanate (IPDI), and any mixtures thereof. According to one preferable embodiment of the present disclosure, the aromatic diisocyanate compound is MDI.

According to one embodiment of the present disclosure, the epoxy compound used for preparing the adduct comprises an average of one or at least two epoxide groups per molecule (i.e. one or at least two epoxide groups per monomer of the epoxy compound). In some embodiments, the epoxy compound comprises a diepoxide resin selected from a group consisting of glycidyl ether epoxy resin, glycidyl ester epoxy resin, glycidyl amine epoxy resin, alicyclic epoxy resin, aliphatic epoxy resin, phenolic epoxy resin and combinations thereof. According to one embodiment of the present application, the epoxy compound is selected from the group consisting of $C_2$-$C_{16}$ alkyl glycidyl ether, $C_6$-$C_{16}$ aryl glycidyl ether, ethoxylated $C_2$-$C_{16}$ fatty alcohol glycidyl ether, $C_2$-$C_{16}$ fatty alcohol glycidyl ether, glycidyl (meth)acrylate, $C_2$-$C_{12}$ alkylene glycol diglycidyl ether, bisphenol A epoxy resin, bisphenol F epoxy resin, novolac epoxy resin, and any combinations thereof. In a preferable embodiment, the epoxy resin is a bisphenol-A epoxy resin. In some embodiments, the epoxy resin is a bisphenol-A epoxy resin having an epoxide equivalent weight (EEW) in the range of 160 to 1500. In some embodiments, the epoxy resin is a bisphenol-A epoxy resin having an epoxide equivalent weight (EEW) in the range of 220 to 800. In some embodiments, the epoxy resin has a viscosity in the range of about 100 cP to about 500,000 cP at room temperature. In some embodiments, the epoxy resin has a viscosity in the range of about 1,000 cP to about 20,000 cP at room temperature. In some embodiments, the epoxy resin has a viscosity in the range of about 8,000 cP to about 16,000 cP at room temperature. In some embodiments, the viscosity is from 100 cP, 1,000 cP or 8,000 cP to 10,000 cP, or 12,000 cP, or 14,000 cP, or 16,000 cP.

The adduct may be prepared in the presence of a catalyst which can promote the reaction of the two raw materials. Without being limited to theory, the catalysts can include, for example, glycine salts; tertiary amines; tertiary phosphines, such as trialkylphosphines and dialkylbenzylphosphines; morpholine derivatives; piperazine derivatives; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof. According to a preferable embodiment, the catalyst is selected from the group consisting of triphenyl antimony and idodine, 1,8-diazabicyclo(5.4.0)undec-7-ene, aluminum chloride, and any combinations thereof. In the context of the present disclosure, "triphenyl antimony and idodine" refers to a catalyst system in which both the triphenyl antimony and the idodine are added into the reaction.

Tertiary amine catalysts include organic compounds that contain at least one tertiary nitrogen atom and are capable of catalyzing the hydroxyl/isocyanate reaction. The tertiary amine, morpholine derivative and piperazine derivative catalysts can include, by way of example and not limitation, triethylenediamine, tetramethylethylenediamine, pentamethyl-diethylene triamine, bis(2-dimethylaminoethyl)ether, triethylamine, tripropylamine, tributyl-amine, triamylamine, pyridine, quinoline, dimethylpiperazine, piperazine, N-ethylmorpholine, 2-methylpropanediamine, methyltriethylenediamine, 2,4,6-tridimethylamino-methyl)phenol, N,N',N"-tris(dimethyl amino-propyl)sym-hexahydro triazine, or mixtures thereof.

In another embodiment, the addition reaction may occur under elevated temperature (e.g. under reflux) or decreased pressure.

In general, the content of the content of the epoxy-aromatic diisocyanate adduct is from 1 mol % to 60 mol %, or from 5 mol % to 50 mol %, or from 8 mol % to 40 mol %, or from 10 mol % to 30 mol %, or from 14 mol % to 20 mol %, based on the molar content of the isocyanate-reactive component (B).

3. Phosphate Ester Polyol

Phosphate ester polyols suitable for use in the present disclosure are the reaction products of polyols with phosphoric acid or polyphosphoric acid, they may have two or more hydroxyl groups and one or more phosphate ester moieties as follows:

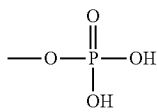

The polyols suitable for preparing the ester can be the polyols for the isocyanate-reactive component (B). Suitable phosphate ester polyols have a molecular weight of at least 90, or at least 200, or at least 400 g/mol, to not higher than 4000, or not higher than 2000 or not higher than 900 g/mol.

In some embodiments, suitable phosphate ester polyols are those containing a urethane linkage, which are made by further reacting a phosphate ester polyol with one or more polyisocyanates or diisocyanates.

In general, the content of the content of the phosphate ester polyol is from 1 mol % to 60 mol %, or from 5 mol % to 50 mol %, or from 10 mol % to 40 mol %, or from 12 mol % to 30 mol %, or from 14 mol % to 20 mol %, based on the molar content of the isocyanate-reactive component (B).

Catalyst

The reaction between the component (A), component (B) and the adhesion promoters may occur in the presence of one or more catalysts that can promote the reaction between the isocyanate group and the isocyanate-reactive group. Without being limited to theory, the catalysts can include, for example, glycine salts; tertiary amines; tertiary phosphines, such as trialkylphosphines and dialkylbenzylphosphines; morpholine derivatives; piperazine derivatives; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof.

Tertiary amine catalysts include organic compounds that contain at least one tertiary nitrogen atom and are capable of catalyzing the hydroxyl/isocyanate reaction. The tertiary amine, morpholine derivative and piperazine derivative catalysts can include, by way of example and not limitation, triethylenediamine, tetramethylethylenediamine, pentamethyl-diethylene triamine, bis(2-dimethylaminoethyl)ether, triethylamine, tripropylamine, tributyl-amine, triamylamine, pyridine, quinoline, dimethylpiperazine, piperazine, N-ethylmorpholine, 2-methylpropanediamine, methyltriethylenediamine, 2,4,6-tridimethylamino-methyl)phenol, N,N',N"-tris(dimethyl amino-propyl)sym-hexahydro triazine, or mixtures thereof.

In general, the content of the catalyst used herein is larger than zero and is at most 1.0 wt %, preferably at most 0.5 wt %, more preferably at most 0.05 wt %, based on the total weight of the isocyanate component (A), the isocyanate-reactive component (B) and the adhesion promoters.

Additives

Various additives may be further included in the adhesive composition according to the specific requirements. These additives can be transmitted and store as independent components and incorporated into the adhesive composition shortly or immediately before the combination of components (A) and (B). Alternatively, these additives may be contained in either of components (A) and (B) when they are chemically inactive to the isocyanate group or the isocyanate-reactive group. According to various embodiments of the present disclosure, the additives include, but are not limited to, tackifiers, plasticizers, rheology modifiers, antioxidants, fillers, colorants, pigments, water scavenger, surfactants, solvents, diluents, flame retardant and combinations of two or more thereof.

The Laminate Article

In one embodiment of the present disclosure, the laminate article comprises, from top to bottom, a first substrate, an adhesive layer and a second substrate, wherein the adhesive layer is formed with the adhesive composition of the present disclosure, and at least one of the substrate is made of metal or metal alloy, preferably aluminum or aluminum alloy.

Manufacture Technology

A method of forming a laminate article using said adhesive composition is also disclosed. The component (A), component (B), the adhesion promoter and any additional additives may be combined shortly or immediately before the lamination process to form a curable mixture, which may be applied by conventional coating technologies such as spraying coating, blade coating, die coating, cast coating, etc. In some embodiments, the adhesive composition, such as the adhesive composition discussed above, and the curable mixture are in a liquid state. In some embodiments, the composition and the curable mixture are liquid at 25° C. Even if the composition is solid at 25° C., it is acceptable to heat the composition as necessary to convert it into a liquid state. A layer of the curable mixture is applied to a surface of the substrate. The substrate is any structure that is 0.5 mm or less in one dimension and is 1 cm or more in both of the other two dimensions. In some embodiments, the thickness of the layer of the curable mixture applied to the substrate is 1 to 5 μm.

In some embodiments, a surface of another substrate is brought into contact with the layer of the curable mixture to form an uncured laminate. The curable mixture is then cured or allowed to cure. The uncured laminate may be subjected to pressure, for example by passing through nip rollers, which may or may not be heated. The uncured laminate may be heated to speed the cure reaction.

The laminate product disclosed herein can be cut or otherwise shaped so as to have a shape suitable for any desired purpose, such as packaging material.

EXAMPLES

Some embodiments of the invention will now be described in the following Examples, wherein all parts and percentages are by weight unless otherwise specified. However, the scope of the present disclosure is not, of course, limited to the formulations set forth in these examples. Rather, the Examples are merely inventive of the disclosure.

The information of the raw materials used in the examples is listed in the following table 1:

TABLE 1

Raw materials used in the examples

| Grades | Main component | Vendor |
|---|---|---|
| PDP-70 | Polyester polyol | Stephan |
| NX-9005 | Castor oil derivative | Cardolite |
| Voranol CP 450 | Cross-linker | Dow |
| Dabco 33LV | Catalyst | Air product |
| 3 Å Molecular sieve | Water scavenger | Grace |
| $Al(OH)_3$ | Filler | Albemarle |
| Coated $Al_2O_3$ | Filler | Huber |
| Green paste | Pigment | Bomex |
| Irganox 1135 | Antioxidant | BASF |
| BPA | Bis-phenol A | Sigma Aldrich |
| HDK N18 | Fume Silica | Wacker |
| KH 560(A-187) | Epoxy Silane | Hexion, ShinEtsu |
| Jeffamine D 400 | Polyether amine | Huntsman |
| CYCLOALIPHATIC EPDXIDE RESIN ERL-4221 | Epoxy diluent | LiYuan |
| $I_2$ | Catalyst | Sigma |
| $Ph_3Sb$ | Catalyst | Sigma |
| PAPI 135/27 | Isocyanate | Dow |
| Voramer MR 1045T | Isocyanate prepolymer | Dow |
| Isonate 125M | MDI | Dow |
| D.E.R.383 | Epoxy resin | Olin |
| Phosphate Polyol (OP550) | Adhesion Promoter | Clarinet |

Preparation Example 1

A polyether amine-epoxy silane adduct was prepared in this preparation example. 10 g Voranol CP450, 2.36 g KH560 and 0.57 g Jeffamine D-400 were added separately into a flask equipped with an addition funnel, a reflux condenser and a mechanical stirrer and thoroughly stirred until a homogeneous liquid phase was formed. The content is the flask was heated at 50° C. for 4 hours, during which the IR epoxy peak in the reactants were monitored with a FT-IR spectrophotometer. The product was marked as Adduct 1.

Preparation Example 2

A polyether amine-epoxy silane adduct was prepared in this preparation example. 10 g Voranol CP450, 1.68 g KH560, 0.9 g DER 383 and 0.57 g Jeffamine D-400 were added separately into a flask equipped with an addition funnel, a reflux condenser and a mechanical stirrer and thoroughly stirred until a homogeneous liquid phase was formed. The content is the flask was heated at 50° C. for 4 hours, during which the IR epoxy peak in the reactants were monitored with a FT-IR spectrophotometer. The product was marked as Adduct 2.

Preparation Example 3

An epoxy-aromatic diisocyanate adduct was prepared in this preparation example. 10 g DER 383 and 2 g ERL-4221 were added separately into a flask equipped with an addition funnel, a reflux condenser and a mechanical stirrer. The content is the flask was added to a temperature of 60° C. and thoroughly stirred until a homogeneous liquid phase was formed. 0.35 g $Ph_3Sb$ and 0.42 g $I_2$ was added into the flask under stirring, and then 40 g 4,4-MDI was added therein. The temperature of the flask was increased to 170° C. and kept at this temperature for 30 minutes. Then the flask was cooled to 100° C., 52 g PAPI 27 was added therein, the flask was further cooled to 60° C. and mixed for 30 minutes, and then the reaction lasted for another one hour. The product was marked as Adduct 3.

The following Inventive Examples and Comparative Examples were performed with the following general procedures by using the specific formulations listed in Table 2.

The Preparation of Polyol Part (Part A)

A stainless steel vessel was cleaned to remove any dirt, grease and residual chemical reagents. One or more polyols and optional crosslinker were added into the vessel and mixed for 15 minutes. The vessel was evacuated to full vacuum, the content was mixed for another 0.5 hour, and then the vacuum was released. The moisture content in the vessel was monitored, and the above said evacuating step was repeated when there was still detectable moisture in the vessel. Catalyst and water scavenger were added into the vessel and the content was mixed under vacuum until a homogeneous dispersion was produced. One or more adhesion promoters compatible with the isocyanate component (i.e. the polyether amine-epoxy silane and the phosphate ester polyol, when present) were added into the vessel and the mixture was mixed until a homogeneous dispersion was produced. Any additional additives (e.g. pigment, filler, antioxidant, etc.) were added into the vessel and the content was mixed with a higher shear dispenser under full vacuum and 60° C., until a smooth surface can be observed by naked eyes. The mixture was discharged from the vessel and filtrated through a sieve having a mesh size of about 300 μm. The Polyol Part was stored in a 5 gallon drum before the applying of the adhesive layer.

The Preparation of Isocyanate Part (Part B)

A stainless steel vessel was cleaned to remove any dirt, grease and residual chemical reagents. One or more polyisocyanates and optional water scavenger were added into the vessel, and the content was thoroughly mixed under vacuum to produce a homogeneous dispersion. The adhesion promoter compatible with the isocyanate component (i.e. the epoxy-aromatic diisocyanate adduct, when present) was optionally added into the vessel. Any additional additives (e.g. pigment, filler) were added into the vessel and the content was mixed with a higher shear dispenser under full vacuum and 40° C., until a smooth surface can be observed by naked eyes. The mixture was discharged from the vessel and filtrated through a sieve having a mesh size of about 300 μm. The Isocyanate Part was stored in a 5 gallon drum before the applying of the adhesive layer.

The Preparation of the Laminate Article

Different isocyanate parts and polyol parts were combined at room temperature (about 25° C.) to form adhesives which were applied on 3003 alloy substrate to produce laminate articles. The laminate articles were cured at room temperature for 7 days, cut into specimens and characterized by the following technologies.

Characterization Technologies

Glass Transition Temperature (Tg): DSC (DIN ISO 11357), from −50° C. to 150° C., 10° C./min, 2nd heating result;

Tensile Strength and Elongation: DIN EN ISO 527-2, dog-bone sample test, test speed: 2 mm/min Lap Shear strength: DIN EN 1465, thickness: 0.2 mm, test speed: 5 mm/min.

TABLE 2 the Formulation and characterization results of Inventive Examples 1-3 and Comparative Examples 1-6

|  |  | Comp-1 | Comp-2 | Comp-3 | Comp-4 | Comp-5 | Comp-6 | Ex-1 | Ex-2 | Ex-3 |
|---|---|---|---|---|---|---|---|---|---|---|
| Part A | Voranol CP450 | 4.50 | 4.50 | 4.50 | 4.50 | 4.50 | 4.50 | 4.50 | 4.50 | 4.50 |
|  | Stephen PDP-70 | 11.26 | 11.26 | 5.41 | 10.03 | 5.41 | 5.41 | 9.03 | 5.41 | 5.41 |
|  | $Al_2O_3$ | 14.86 | 14.86 | 20.74 | 14.86 | 14.86 | 14.86 | 14.86 | 14.86 | 14.86 |
|  | NX-9005 | 4.50 | 4.50 | 4.50 | 4.50 | 4.50 | 4.50 | 4.50 | 4.50 | 4.50 |
|  | Fume silica | 0.90 | 0.90 | 0.90 | 0.90 | 0.90 | 0.90 | 0.90 | 0.90 | 0.90 |
|  | Molecular sieve 3Å | 2.25 | 2.25 | 2.25 | 2.25 | 2.25 | 2.25 | 2.25 | 2.25 | 2.25 |
|  | $Al(OH)_3$ | 4.50 | 4.50 | 4.50 | 4.50 | 4.50 | 4.50 | 4.50 | 4.50 | 4.50 |
|  | BPA | 2.25 | 2.25 | 2.25 | 2.25 | 2.25 | 2.25 | 2.25 | 2.25 | 2.25 |
|  | Jeffamine (D400) |  |  |  |  |  | 5.86 |  |  |  |
|  | KH560 (epoxy silane) |  |  |  |  | 5.86 |  |  |  |  |
|  | Adduct 1 |  |  |  | 1.26 |  |  | 2.26 | 5.86 |  |
|  | Adduct 2 |  |  |  |  |  |  |  |  | 6.20 |
|  | Dabco 33LV | 0.01 | 0.01 | 0.01 | 0.01 | 0.01 | 0.01 | 0.01 | 0.01 | 0.01 |
| Part B | PAPI 135/27 | 9.01 | 10.81 | 10.81 | 10.81 | 10.81 | 10.81 | 10.81 | 10.81 | 11.81 |
|  | Voramer MR 1045T | 10.81 | 10.81 | 10.81 | 10.81 | 10.81 | 10.81 | 10.81 | 10.81 | 10.81 |
|  | Coated $Al_2O_3$ | 29.73 | 27.93 | 27.93 | 27.93 | 27.93 | 27.93 | 27.93 | 27.93 | 27.93 |
|  | Fume silica | 0.90 | 0.90 | 0.90 | 0.90 | 0.90 | 0.90 | 0.90 | 0.90 | 0.90 |
|  | Molecular sieve 3Å | 4.50 | 4.50 | 4.50 | 4.50 | 4.50 | 4.50 | 4.50 | 3.50 | 3.1 |
| Total |  | 100.00 | 100.00 | 100.00 | 100.00 | 100.00 | 100.00 | 100.00 | 100.00 | 100.00 |
| Lap shear strength (MPa) |  | 11 | 8.8 | 9.2 | 10.5 | 7.3 | 0 (gel fast) | 14.6 | 17.2 | 17.8 |
| Failure mode |  | Adhesion failure | Adhesion failure | Adhesion failure | Cohesion Failure | Adhesion failure | NA | Cohesion Failure | Cohesion Failure | Cohesion Failure |
| Tensile strength (MPa) |  | 9-10 | 10-11 | 11-12 | 12-13 | 10-12 | NA | 14-16 | 17-18 | 18-20 |
| Elongation (%) |  | 19-21 | 16-17 | 10-11 | 10-11 | 10-12 | NA | 9-10 | 8-10 | 8-10 |
| Tg (° C.) |  | 25 | 26 | 28 | 30 | 28 | NA | 32 | 35 | 35 |

Two additional experiments were conducted by repeating the above stated inventive Example 1, except that the Adduct 1 was partially replaced with Adduct 3 (added into the Isocyanate Part) or OP550 (added into the Polyol Part), and superior adhesion strength could also be achieved.

As can be seen from the above experimental results, the adhesion promoters prepared in the Inventive Examples significantly improve the adhesion strength between the adhesive layer and the metal alloy substrates.

Please refer to FIG. 1, in which the laminate articles prepared in Comparative Example 5, Inventive Example 1 and Inventive Example 2 have been torn apart. Comparative Example 5 shows that the replacement of the adduct adhesion promoter of the present application with the epoxy silane results in lower adhesion strength and adhesion failure, which means that after break, the adhesive could only stick on one substrate and no residue adhesive is left on another substrate. In contrast, adhesive layer of the Inventive Example 1 and Inventive Example 2 are left on both substrates (the so-called Cohesion Failure mode), which represents a much higher cohesion force.

What is claimed is:

1. A two-component adhesive composition, comprising (A) an isocyanate component comprising one or more compounds having at least two isocyanate groups; and (B) an isocyanate-reactive component comprising one or more compounds having at least two isocyanate-reactive groups, wherein the two-component adhesive composition further comprises:

an polyether amine-epoxy silane adduct derived from the reaction between:

(i) at least one polyether amine represented by Formula I:

Formula I $R_1$ being a poly(alkylene oxide) group comprising from 2 to 2,000 carbon atoms and terminated with an amino group, an $C_1$-$C_6$ alkyl or a hydrogen atom; and $R_2$ being selected from the group consisting of a poly(alkylene oxide) group comprising from 2 to 2,000 carbon atoms and terminated with an amino group, an $C_1$-$C_6$ alkyl or a hydrogen atom; hydrogen; $C_2$-$C_{12}$ alkyl group; amino substituted $C_2$-$C_{12}$ alkyl group; $C_6$-$C_{16}$ cycloalkyl group; amino substituted $C_6$-$C_{16}$ cycloalkyl group; $C_7$-$C_{16}$ aralkyl group; amino substituted $C_7$-$C_{16}$ aralkyl group; $C_6$-$C_{16}$ aryl group; and amino substituted $C_6$-$C_{16}$ aryl group;

(ii) at least one epoxy-silane compound represented by Formula II:

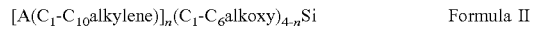

Formula II

A being selected from the group consisting of glycidyl, glycidyloxy and epoxidized $C_4$-$C_6$ cycloalkyl, n being an integer of 1, 2, 3 or 4; and (iii) at least one cross-linker;

the content of the polyether amine-epoxy silane adduct being from 5 wt % to 35 wt %, based on a weight content of the isocyanate-reactive component (B).

2. The two-component adhesive composition according to claim 1, wherein the one or more compounds having at least two isocyanate groups are selected from the group consisting of:
- a) $C_4$-$C_{12}$ aliphatic polyisocyanates comprising at least two isocyanate groups, $C_6$-$C_{15}$ cycloaliphatic or aromatic polyisocyanates comprising at least two isocyanate groups, $C_7$-$C_{15}$ araliphatic polyisocyanates comprising at least two isocyanate groups, and a combination thereof; and
- b) an isocyanate prepolymer prepared by reacting one or more polyisocyanates of a) with one or more isocyanate-reactive components selected from the group consisting of $C_2$-$C_{16}$ aliphatic polyhydric alcohols comprising at least two hydroxy groups, $C_6$-$C_{15}$ cycloaliphatic or aromatic polyhydric alcohols comprising at least two hydroxy groups, $C_7$-$C_{15}$ araliphatic polyhydric alcohols comprising at least two hydroxy groups, polyester polyols having a molecular weight from 500 to 5,000, polycarbonate diols having a molecular weight from 200 to 5,000, polyether polyols having a molecular weight from 200 to 5,000, $C_2$ to $C_{10}$ polyamine comprising at least two amino groups, $C_2$ to $C_{10}$ polythiol comprising at least two thiol groups, $C_2$-$C_{10}$ alkanolamine comprising at least one hydroxyl group and at least one amino group, and a combination thereof, with the proviso that the isocyanate prepolymer comprises at least two free isocyanate terminal groups.

3. The two-component adhesive composition according to claim 1, wherein the one or more compounds having at least two isocyanate-reactive groups are selected from the group consisting of: $C_2$-$C_{16}$ aliphatic polyhydric alcohols comprising at least two hydroxy groups, $C_6$-$C_{15}$ cycloaliphatic or aromatic polyhydric alcohols comprising at least two hydroxy groups, $C_7$-$C_{15}$ araliphatic polyhydric alcohols comprising at least two hydroxy groups, polyester polyols having a molecular weight from 500 to 5,000, polycarbonate diols having a molecular weight from 200 to 5,000, polyether polyols having a molecular weight from 200 to 5,000, $C_2$ to $C_{10}$ polyamine comprising at least two amino groups, $C_2$ to $C_{10}$ polythiol comprising at least two thiol groups, $C_2$-$C_{10}$ alkanolamine comprising at least one hydroxyl group and at least one amino group, vegetable oil having at least two hydroxyl groups, and a combination thereof.

4. The two-component adhesive composition according to claim 1, wherein the one or more compounds having at least two isocyanate-reactive groups includes a polyester polyol and a vegetable oil having at least two hydroxyl groups.

5. A laminate article comprising a first substrate, a second substrate and an adhesive layer therebetween, wherein the adhesive layer is prepared with the two-component adhesive composition according to claim 1 by reacting the isocyanate component (A) with the isocyanate-reactive component (B) and the polyether amine-epoxy silane adduct, and the adhesive layer comprises a polyurethane main chain to which residual moiety of the polyether amine-epoxy silane adduct is covalently attached.

6. A method for preparing the laminate article of claim 5, comprising the steps of
- providing the first substrate and the second substrate;
- combining the isocyanate component (A) with the isocyanate-reactive component (B) and the polyether amine-epoxy silane adduct to form an adhesive precursor;
- adhering the first substrate and the second substrate together with the adhesive precursor;
- curing the adhesive precursor or allowing the adhesive precursor to cure.

\* \* \* \* \*